United States Patent
Maga

(10) Patent No.: US 10,555,638 B2
(45) Date of Patent: Feb. 11, 2020

(54) ADJUSTABLE OUTDOOR COOKING ASSEMBLY

(71) Applicant: Frank Bartholomew Maga, Frazier Park, CA (US)

(72) Inventor: Frank Bartholomew Maga, Frazier Park, CA (US)

(*) Notice: Subject to any disclaimer, the term of this patent is extended or adjusted under 35 U.S.C. 154(b) by 159 days.

(21) Appl. No.: 15/857,482

(22) Filed: Dec. 28, 2017

(65) Prior Publication Data
US 2018/0184840 A1   Jul. 5, 2018

Related U.S. Application Data

(60) Provisional application No. 62/441,683, filed on Jan. 3, 2017.

(51) Int. Cl.
*A47J 33/00* (2006.01)
*A47J 37/07* (2006.01)

(52) U.S. Cl.
CPC ........... *A47J 33/00* (2013.01); *A47J 37/0763* (2013.01); *A47J 2037/0795* (2013.01)

(58) Field of Classification Search
CPC .......................... A47J 33/00; A47J 2037/0795
USPC .................................. 126/30, 40, 26; 99/450
See application file for complete search history.

(56) References Cited

U.S. PATENT DOCUMENTS

| | | | | |
|---|---|---|---|---|
| 3,018,771 A | * | 1/1962 | Curtis | A47J 37/0772 126/25 A |
| 3,331,365 A | * | 7/1967 | Sussan | A47J 37/0763 126/25 R |
| 3,359,887 A | * | 12/1967 | Cleveland | A47J 37/0745 99/421 HV |
| 3,523,508 A | * | 8/1970 | Maslow | A47B 57/265 108/147.13 |
| 4,109,567 A | * | 8/1978 | Gage | A47J 33/00 108/147.13 |
| 4,538,589 A | * | 9/1985 | Preston | A47J 33/00 126/25 A |
| 4,796,599 A | * | 1/1989 | Cooper | A47J 33/00 126/25 A |
| D356,005 S | * | 3/1995 | Goble | D7/337 |
| 5,819,718 A | | 10/1998 | Leiser | |
| 6,105,569 A | | 8/2000 | Andress | |

(Continued)

OTHER PUBLICATIONS

International Search report and Written Opinion of the international Searching Authority, International application No. PCT/US2019/041115.

*Primary Examiner* — Avinash A Savani
(74) *Attorney, Agent, or Firm* — Roland J. Tong

(57) ABSTRACT

An outdoor cooking assembly includes a plurality of poles configured to support a cooking grate above an open fire. The grate is connected to the poles by a lockable adjustment mechanism that allows a user to adjust the height of the grate above the fire. The adjustment mechanism includes a plurality of sleeves that may be attached directly to the grate, or to a frame that supports the grate from below, and that are slidable on the support poles. The assembly also includes a releasable locking mechanism for preventing unintentional sliding movement of each sleeve along its pole, a locking tool allowing a user to manipulate the locking mechanism without touching locking mechanism, and a grasping tool allowing the user to reposition the grate without physically contacting the grate.

20 Claims, 3 Drawing Sheets

(56) References Cited

U.S. PATENT DOCUMENTS

| | | |
|---|---|---|
| 9,554,669 B1 | 1/2017 | Hughes |
| 2004/0016349 A1* | 1/2004 | Robertson ............... A47J 33/00 99/449 |
| 2004/0099151 A1* | 5/2004 | Wild ................... A47J 37/0704 99/450 |
| 2014/0360483 A1* | 12/2014 | Mattix ................... A47J 33/00 126/30 |
| 2015/0196163 A1 | 7/2015 | Robles |

* cited by examiner

ADJUSTABLE OUTDOOR COOKING ASSEMBLY

CROSS-REFERENCE TO RELATED APPLICATIONS

This application claims the benefit of U.S. Provisional Application No. 62/441,683, filed Jan. 3, 2017. The contents of that provisional application are hereby incorporated herein by reference.

TECHNICAL FIELD

The present disclosure relates in general outdoor cooking grills and more particularly to an adjustable and portable cooking grill for using over an open fire.

BACKGROUND

A typical open fire cooking grill comprises a flat grate made of non-combustible, fire-resistant material such as steel, stainless steel, or titanium. The grate may be supported by the rim of a firepit, or mounted on a single pole, or between two poles, or it may be suspended above the fire by a tripod. Many of these types of cooking grills are not adjustable; that is, the grate remains at a constant height above the fire, increasing the chances of burning the food on the grate if the flames are too high, or not cooking the food sufficiently if the flames are too low. Some such grills are adjustable, but the knobs, levers, or latches required for adjustment can not be easily manipulated without exposing the user to extremely high temperatures. In addition, these grills are bulky and difficult to assemble, disassemble, and clean. These and other problems of existing open fire cooking grills are addressed by the present disclosure as summarized below.

SUMMARY

An outdoor cooking assembly according to the present disclosure comprises a plurality of poles configured to support a cooking grate above an open fire. The grate is connected to the poles by an adjustment mechanism that allows a user to adjust the height of the grate above the fire.

In one embodiment, the adjustment mechanism comprises a frame that is configured to support the cooking grate. The frame includes a plurality of sleeves, each of which is configured for slidable movement along one of the poles. In another embodiment, the frame is eliminated, and the sleeves are coupled directly to the cooking grate.

According to one aspect of the invention, each sleeve of the adjustment mechanism includes a releasable locking mechanism configured to prevent unintentional sliding movement of the sleeve along its pole. A locking tool is provided to allow manipulation of the locking mechanism without requiring the user to physically contact the locking mechanism.

According to another aspect of the invention, the assembly also includes a grasping tool configured to allow a user to move the grate vertically along the poles without physically contacting the grate.

A releasable locking mechanism prevents unintentional sliding movement of the sleeves along the poles.

In one aspect of the invention, the cooking grate includes a perimeter and a plurality of bars extending between the perimeter. The grasping tool comprises a hook and a thermally insulating handle coupled to the hook and configured to be held by a user allowing the user to pull the hook upwardly to raise the grate or move the hook downwardly to lower the grate. In the embodiment including a frame, the hook of the grasping tool is configured to engage a central bar extending across opposite sides of the frame. In the embodiment without a frame, the hook is configured to engage one of the bars of the cooking grate.

The cooking assembly may include an upper cooking grate and a lower cooking grate, each having its own lockable adjustment mechanism allowing the grates to be moved vertically with respect to one another. A grasping tool allows a user to move the grates along a set of support poles without physically contacting the grates. The grasping tool includes a hook, a handle, and an elongated strip extending between the handle and the hook. A plurality of vertically-spaced apart apertures is formed in the strip. To change the position of the lower grate, a user may first manipulate the hook to engage either the lower grate itself or the central bar of a frame supporting the lower grate, and may then extend a positioning pin through one of the apertures in the elongated strip. When the pin is supported on the upper grate, the grasping tool is locked in place relative to the upper grate, and the lower grate is prevented from moving downwardly relative to the upper grate. The user can then release the locking mechanism on the lower frame, remove the positioning pin from the aperture, raise or lower the hook to reposition the lower grate, and finally retighten the locking mechanism when the lower grate is in its desired position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
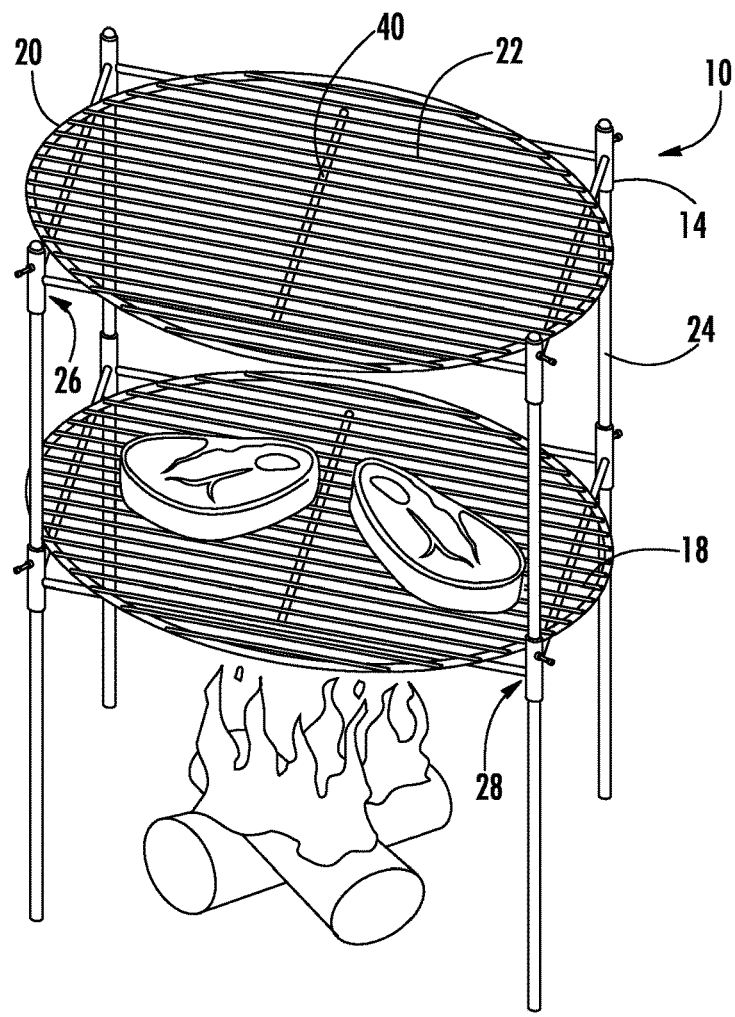
FIG. 1 is a perspective view showing an adjustable outdoor cooking assembly according to the present disclosure.

FIG. 1 shows a portable outdoor cooking assembly 10 according to the present disclosure being used to grill various foods over an open fire. The assembly 10 includes an upper grate 14, which may be used to cook vegetables or other foods that burn easily (or to warm food that has already been cooked), and a lower grate 18, which may be used to cook foods such as meats that require higher heats. One of the grates 14, 18 may be removed if a small amount of only one type of food is being cooked or, alternatively, one or more additional grates may be added if more food is being cooked.

Each grate 14, 18 comprises an outer perimeter 20 and a grid formed from a plurality of horizontally extending bars 22. Both the outer perimeter 20 and the horizontally extending bars 22 are manufactured from a fire-resistant, non-combustible material such as steel, stainless steel, titanium, or combinations thereof. The grates 14, 18 are supported above the fire 12 by a plurality of vertically extending support poles 24 that are preferably manufactured from the same or similar material(s) as the grates 14, 18.

Figure 2:
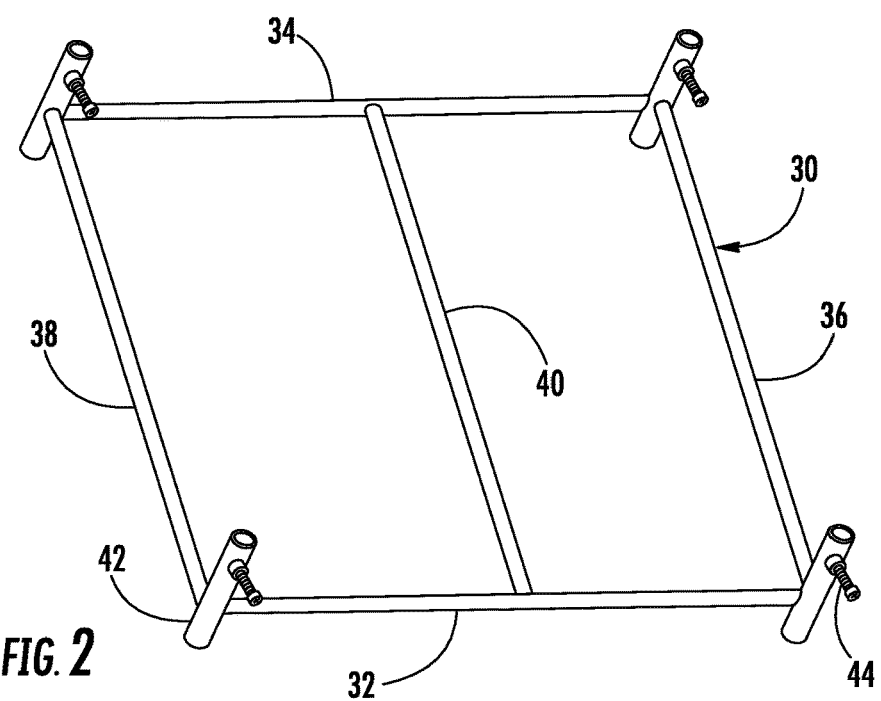
FIG. 2 is a perspective view showing a frame from the assembly of FIG. 1.
Figure 3:
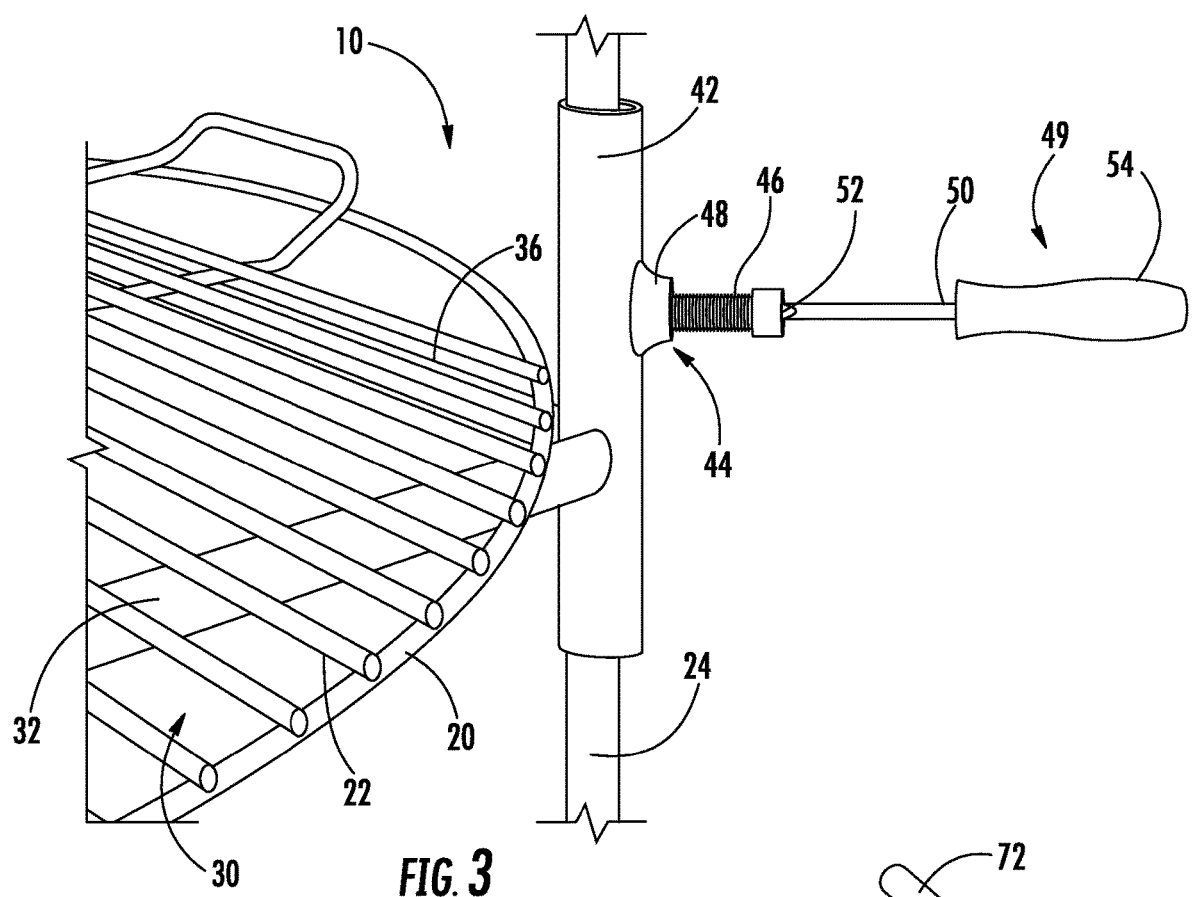
FIG. 3 is a fragmentary perspective view operation of a locking mechanism in the assembly of FIG. 1.

An upper adjustment mechanism 26 allows the height of the of the upper grate 14 to be adjusted, and a lower adjustment mechanism 28 allows the height of the lower grate 18 to be adjusted. As best seen in FIGS. 2 and 3, the upper adjustment mechanism 26 includes an upper frame 30 that extends below the upper grate 14. The upper frame 30 has opposite sides defined by a pair of spaced apart side bars 32, 34, and opposite ends defined by a pair of end bars 36, 38 that extend at right angles to the side bars 32, 34. A central bar 40 extends horizontally between the side bars 32, 34. Other bars may be added if needed to reinforce the frame 30. The frame 30 may also be constructed in other shapes than the square or rectangular shape illustrated, provided its dimension and strength are sufficient to hold the weight of the upper grate 14 and any food supported on it.

A plurality of cylindrical sleeves 42 is provided on the exterior of the upper frame 30. Each sleeve 42 is carried by a different one of the support poles 24, and has an inner diameter slightly larger than the outer diameter of the associated pole 24, allowing it to slide freely along the pole 24 for adjustment purposes. A releasable locking mechanism 44 is provided on each sleeve 42 for preventing sliding movement of the sleeve 42 when the adjustment is complete. In the illustrated embodiment, the releasable locking mechanism 44 comprises an externally threaded set screw 46 that extends through an internally threaded bore in a boss 48 formed on a side of the sleeve 42. Other locking mechanisms such as friction clips or pin/receptacle assemblies may also be used.

The cooking assembly 10 also includes a locking tool 49 configured to cooperate with the locking mechanism 44 to lock or unlock the sleeve 42 as needed. In the illustrated embodiment, the locking tool 49 comprises a screwdriver having an elongated shaft 50 with a tip 52 that engages the head of the set screw 46. A thermally insulating handle 54 at the proximal end of the shaft 50 protects the user's hand from exposure to high temperatures while locking or unlocking the sleeve 42. Other type of locking tools may also be used, depending on the type of locking mechanism used, provided that the tools are sufficiently long and thermally insulating to protect the user.

Figure 5:
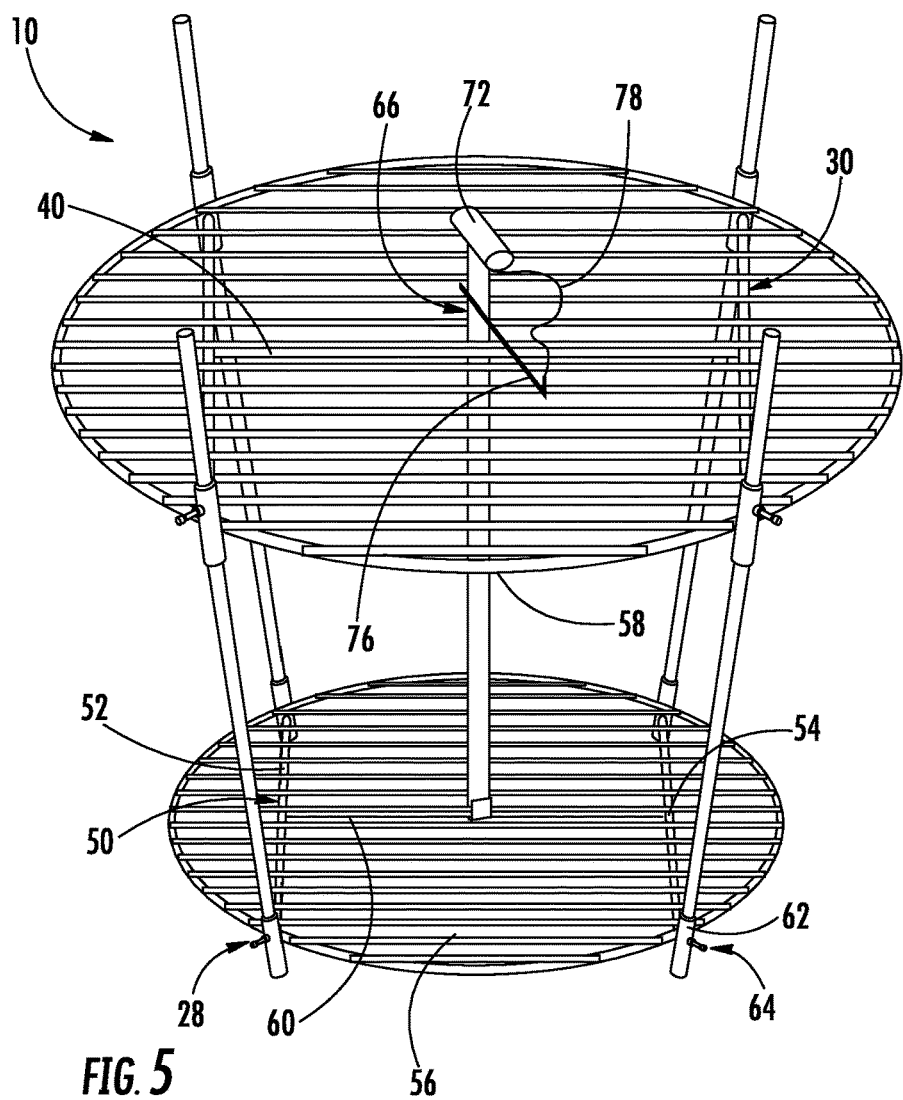
FIG. 5 is a perspective view showing the grasping tool of FIG. 4 in use with the outdoor cooking assembly of FIG. 1.

As shown in FIG. 5, the lower adjustment mechanism 28 preferably includes a lower frame 50 that is similar or identical in structure to the upper frame 30. That is, the lower frame 50 includes side bars 52, 54, end bars 56, 58, a central bar 60, and cylindrical sleeves 62 having locking mechanisms 64, similar or identical to their counterparts in the lower frame 30. A grasping tool 66 is provided to allow a user to change the position of the lower frame 50 relative to the upper frame 30, without exposing the user to extremely high temperatures.

Figure 4:
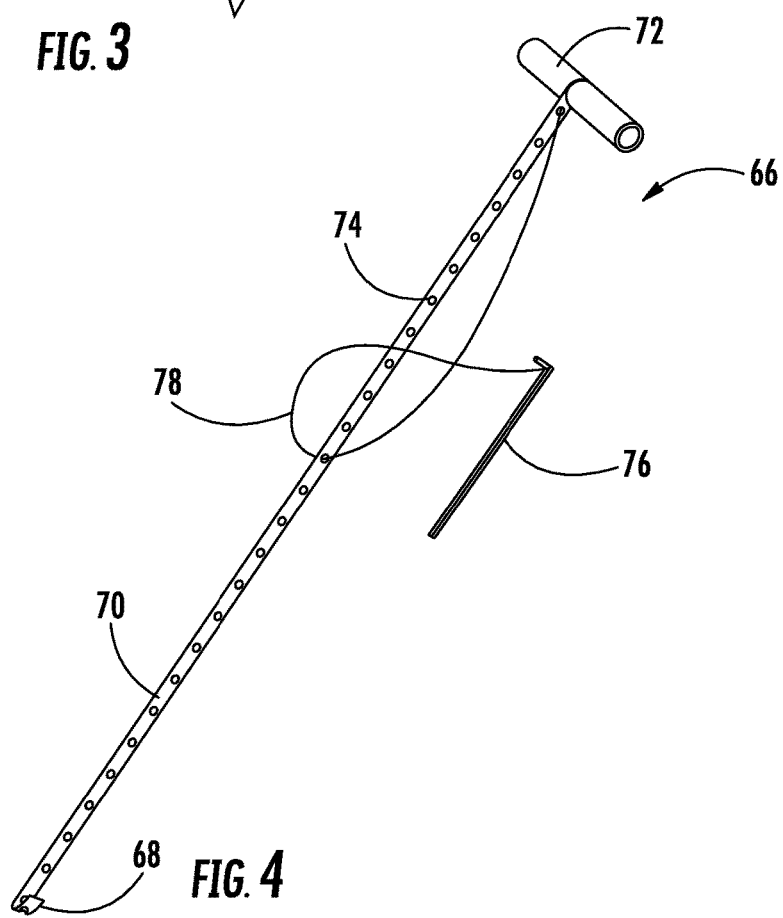
FIG. 4 is a perspective view showing a grasping tool for the outdoor cooking assembly of FIG. 1.

As best seen in FIG. 4, the grasping tool 66 comprises an elongated strip 70 of steel or other material capable of withstanding high temperatures. A hook 68 is formed at one end of the strip 70, and a handle 72 made of wood or other thermal insulating material is provided at the other end of the strip. A plurality of spaced apart apertures 74 extend along the length of the strip. A positioning pin 76 is secured by a cord, wire, or cable 78 to the handle 72 or another portion of the tool 66.

To adjust the lower grate 18 of the cooking assembly 10, a user extends the grasping tool 66 through the bars 22 of the upper grate 14 and manipulates the tool 66 until the hook 68 engages the central bar 60 of the lower frame 50. The user then inserts the positioning pin 76 through the aperture 74 nearest the upper grate 14, as shown in FIG. 5. When the positioning pin 76 is supported on the upper grate 14, the grasping tool 66 is locked in place relative to the upper grate 14, and the lower grate 18 is prevented from moving downwardly relative to the upper grate 14. The user can then release the locking mechanism 64 on the lower frame 50, remove the positioning pin 76 from the aperture 74, raise or lower the hook 68 to reposition the lower frame 50 and grate 18, and finally retighten the locking mechanism 64 when the lower grate 18 is in its desired position.

Figure 6:
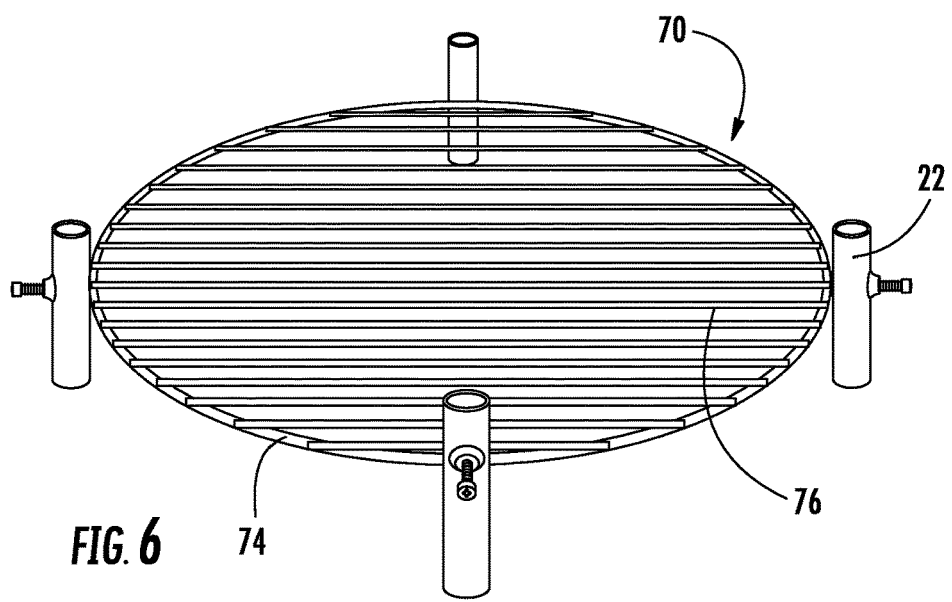
FIG. 6 is a perspective view showing a cooking grate according to an alternate embodiment of the disclosure.

A cooking grate 70 according to an alternate embodiment of the disclosure is shown in FIG. 6. In this embodiment, the support frame is eliminated, and the adjustment mechanism comprises a plurality of cylindrical sleeves 72 that are integrally coupled to the perimeter 74 of the grate 70. In all other respects, the structure and operation of an outdoor cooking assembly having this type of grate 70 is identical to the structure and operation of the outdoor cooking assembly of FIGS. 1-5, except that the hook of the grasping tool is manipulated to grasp one of the horizontal bars 76 of the grate 70, rather than the central bar of a frame.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An outdoor cooking assembly comprising:
 a cooking grate;
 a plurality of vertically extending poles configured to support the grate above an open fire;
 a plurality of cylindrical sleeves configured to attach the grate and the poles at right angles to one another, each sleeve configured to be slidably received on one of the poles;
 a releasable locking mechanism carried by each sleeve, each releasable locking mechanism being movable between a locked configuration wherein the locking mechanism engages a pole, preventing the sleeve from sliding vertically along the pole, and an unlocked configuration wherein the locking mechanism is disengaged from the pole, allowing the sleeve to slide vertically along the pole;
 a locking tool having an elongated distal end configured to cooperate with the locking mechanism and a thermally insulating proximal end configured to be grasped by a user, allowing the user to move the locking mechanism between the locked and unlocked configurations.

2. An outdoor cooking assembly comprising:
 a cooking grate including a perimeter and a plurality of bars extending between opposite sides of the perimeter;

a plurality of poles configured to support the grate above an open fire;
a plurality of cylindrical sleeves configured to attach the grate and the poles at right angles to one another, each sleeve configured to be slidably received on one of the poles;
a releasable locking mechanism carried by each sleeve, each releasable locking mechanism being movable between a locked configuration wherein the locking mechanism engages a pole, preventing the sleeve from sliding vertically along the pole, and an unlocked configuration wherein the locking mechanism is disengaged from the pole, allowing the sleeve to slide vertically along the pole;
a locking tool having a distal end configured to cooperate with the locking mechanism and a thermally insulating proximal end configured to be grasped by a user, allowing the user to move the locking mechanism between the locked and unlocked configurations; and
a grasping tool configured to allow a user to move the grate vertically along the poles when the adjustment mechanism is unlocked.

3. The outdoor cooking assembly according to claim 2, wherein the sleeves are directly coupled to the perimeter of the grate.

4. The outdoor cooking assembly according to claim 3, wherein the sleeves are integral with the perimeter of the grate.

5. The outdoor cooking assembly according to claim 2, further comprising a frame positioned below the grate and configured to support the grate, wherein the sleeves are directly coupled to the frame.

6. The outdoor cooking assembly according to claim 2, wherein the grasping tool comprises:
an upwardly-opening hook; and
a thermally insulating handle coupled to the hook and configured to be held by a user allowing the user to pull the hook upwardly to raise the grate or move the hook downwardly to lower the grate.

7. The outdoor cooking assembly according to claim 5, wherein the frame comprises a plurality of horizontally extending bars defining opposite sides of the frame.

8. The outdoor cooking assembly according to claim 7, wherein:
the frame further includes a central bar extending between opposite sides of the frame; and
the grasping tool includes
a hook configured to engage the central bar of the frame; and
a thermally insulating handle coupled to the hook and configured to be held by a user allowing the user to pull the hook upwardly to raise the frame or move the hook downwardly to lower the frame.

9. An outdoor cooking assembly comprising:
an upper cooking grate including a perimeter and a plurality of bars extending between opposite sides of the perimeter;
a lower cooking grate including a perimeter and a plurality of bars extending between opposite sides of the perimeter;
a plurality of poles configured to support the grates above an open fire;
a lockable adjustment mechanism coupled to the grates and the poles and configured to prevent vertical movement of the grates along the poles when locked and to allow vertical movement of the grates along the poles when unlocked; and a grasping tool configured to allow a user to move the grates vertically along the poles when the adjustment mechanism is unlocked, wherein the grasping tool includes
a distal end including an upwardly-opening hook,
a proximal end including a thermally insulating handle coupled to the hook and configured to be held by a user, allowing the user to raise or lower the lower grate relative to the upper grate,
an elongated strip extending between the handle and the hook, with a plurality of vertically spaced-apart apertures formed in the strip; and
a positioning pin configured to be supported on the upper grate and to be extended through one of the apertures in the strip, thereby locking the grasping tool in place relative to the upper grate and preventing the lower grate from moving downwardly when the releasable locking mechanisms associated with the lower grate are released.

10. The outdoor cooking assembly according to claim 9, wherein the lockable adjustment mechanism comprises:
a plurality of cylindrical sleeves directly coupled to the perimeter of each grate and configured to slide vertically along the poles; and
a releasable locking mechanism associated with each sleeve and configured to prevent sliding movement of the associated sleeve along its pole.

11. The outdoor cooking assembly according to claim 9, wherein the lockable adjustment mechanism comprises:
an upper frame positioned below and configured to support the upper grate; and
a lower frame positioned below and configured to support the lower grate;
a plurality of sleeves coupled directly coupled to the upper and lower frames, each sleeve configured to be slidably received on one of the poles; and
a releasable locking mechanism configured to prevent sliding movement of each sleeve along its pole.

12. The outdoor cooking assembly according to claim 11, wherein:
each frame includes
a plurality of horizontally extending bars defining opposite sides of the frame, and
a central bar extending between opposite sides of the frame, and
the hook is configured to engage the central bar of the lower frame.

13. The outdoor cooking assembly according to claim 1, wherein the distal end of the locking tool is configured to releasably engage the locking mechanism.

14. The outdoor cooking assembly according to claim 1, wherein:
the releasable locking mechanism includes a shaft extending through an opening in the sleeve, the shaft having
a distal end configured to contact a side of the pole when the mechanism is in the locked configuration, and
a proximal end having a first connector element; and
the distal end of the locking tool comprises a second connector element configured to releasably engage the second connector element.

15. The outdoor cooking assembly according to claim 1, further comprising a frame positioned below the grate and configured to support the grate, wherein the sleeves are directly coupled to the frame.

16. The outdoor cooking assembly according to claim 1, further comprising a grasping tool configured to allow a user to move the grate vertically along the poles when the adjustment mechanism is unlocked, wherein the grasping tool includes:
- a distal end including an upwardly-opening hook; and
- a proximal end including a thermally insulating handle coupled to the hook and configured to be held by a user allowing the user to user to reposition the lower grate.

17. The outdoor cooking assembly according to claim 16, wherein:
the frame includes
- a plurality of horizontally extending bars defining opposite sides of the frame, and
- a central bar extending between opposite sides of the frame; and the hook is configured to engage the central bar of the lower frame.

18. The outdoor cooking assembly according to claim 16, wherein the grasping tool further includes:
- an elongated strip extending between the handle and the hook, with a plurality of vertically spaced-apart apertures formed in the strip; and
- a positioning pin configured to be supported on the upper grate and to be extended through one of the apertures in the strip, thereby locking the grasping tool in place relative to the upper grate and preventing the lower grate from moving downwardly when the releasable locking mechanisms associated with the lower grate are released.

19. The outdoor cooking assembly according to 11, further comprising a locking tool having a distal end configured to releasably engage the locking mechanism.

20. The outdoor cooking assembly according to claim 19, wherein:
the locking mechanism includes a shaft extending through an opening in each sleeve, the shaft having
- a distal end configured to contact a side of the pole when the locking mechanism is in the locked configuration, and
- a proximal end having a first connector element; and the distal end of the locking tool comprises a second connector element configured to releasably engage the second connector element.

* * * * *